__United States Patent Office__

3,661,788
Patented May 9, 1972

3,661,788
STABILIZATION OF METHYLCHLOROFORM
Alastair Campbell, Peter Robinson, and James William Tipping, Runcorn, England, assignors to Imperial Chemical Industries Limited, London, England
No Drawing. Filed July 28, 1969, Ser. No. 845,522
Claims priority, application Great Britain, Aug. 30, 1968, 41,494/68
Int. Cl. C11d 7/50; C23g 5/02
U.S. Cl. 252—171                                 9 Claims

ABSTRACT OF THE DISCLOSURE

Methylchloroform is stabilized with a small amount of pyran, dihydropyran and tetrahydropyran, substituted in any one of the 2, 3, 4, 5, and 6 positions by an —OR group wherein R is hydrogen, lower alkyl, pyranyl, dihydropyranyl, or tetrahydropyranyl. Additional conventional stabilizers such as nitriles, ethers, alcohols, nitrates, nitroalkanes and aliphatic epoxides may also be included in the stabilized methylchloroform composition.

The present invention relates to the stabilisation of methyl chloroform (1,1,1-trichloroethane). More particularly it relates to the protection of methyl chloroform against decomposition during its normal industrial use, particularly in the presence of reactive metals.

In recent years methyl chloroform has become widely used as an industrial solvent, particularly for the degreasing of metals both in the cold and with the solvent at the boil as is known in conventional hot liquor or vapour degreasing. For industrial use this solvent has advantages over the longer-established degreasing solvents such as trichloroethylene and carbon tetrachloride in that it has a lower toxicity and a lower specific gravity. Methyl chloroform does, however, present its own special problems in regard to stability. In contact with reactive metals, notably aluminium and aluminium alloys, the hot solvent can react vigorously, evolving copious amounts of hydrogen chloride and producing tarry residues. Even in the cold, aluminium surfaces freshly exposed, as for instance by scratching or drilling, can cause immediate decomposition and blackening of the solvent and the aluminium is itself corroded and stained. Although methyl chloroform is not so prone to reaction with other metals, slow hydrolysis when water is present or thermal decomposition, also producing acidity, can lead to corrosion of metals such as mild steel and zinc, which may be present in articles being degreased and in the structure of degreasing equipment.

In order to render the solvent suitable for industrial use a wide variety of additives has been proposed to suppress decomposition of the solvent and/or to neutralise acid decomposition products and thereby prevent corrosion of metals in contact with the solvent. Notably, in commercial practice, mixtures of stabilisers chosen from ketones, nitroalkanes, epoxides (oxiranes), alkyl nitrates, 1,4-dioxane, nitriles and aliphatic alcohols have been used with some success, but for the most rigorous conditions of use, e.g. for metal-cleaning assisted by ultrasonic excitation of the solvent, still further improvement in solvent stability is desirable.

According to the present invention we provide a stabilised solvent composition which comprises methyl chloroform and as stabiliser therefor 0.5–10% of its weight of a compound consisting of a carbon/oxygen ring system of the pyran, dihydropyran or tetrahydropyran type which is substituted in any one of the 2, 3, 4, 5 and 6 positions by an —OR group where R is a hydrogen atom, an alkyl radical containing up to six carbon atoms or another of said carbon/oxygen ring systems.

Preferably the stabilised composition contains 1–4% of the said stabiliser compound calculated on the weight of the methyl chloroform.

Suitable stabiliser compounds which are representative of compounds containing respectively a different one of said three types of substituent are 4-hydroxypyran, 2-methoxy-2,3-dihydropyran and bis(4-pyranyl)ether.

We have found that the compounds containing substituted pyran and reduced pyran rings as defined in the penultimate paragraph are more effective than the parent pyran, dihydropyran and tetrahydropyran in suppressing metal-catalysed decomposition of methyl chloroform. This is the more surprising since it has been propsed in U.S.A. patent specification No. 2,870,094 to employ specifically dihydropyran as stabiliser for methyl chloroform that is to be used for cleaning photographic film in order to prevent decomposition of the solvent in contact with aluminium containers and equipment used in the cleaning operations.

We prefer to include in the stabilised solvent compositions of the invention as defined hereinbefore also one or more members of one or more of the following groups of compounds: nitriles, alkyl ethers, alcohols, aliphatic mono-nitrates, nitroalkanes and carboxylic esters, said members being selected from those whose boiling point at normal atmospheric pressure is less than 130° C. We particularly prefer to use one or more of the following compounds: acetonitrile, acrylonitrile, dimethoxyethane, tertiary butanol, isopropyl nitrate, nitromethane, nitroethane and ethyl acetate. Proportions of nitrile, ether, alcohol, aliphatic mononitrate, nitroalkane or carboxylic ester in the range 0.5–10% and preferably in the range 0.5–4% by weight of the methyl chloroform are suitable.

Furthermore, in accordance with the present invention, the substituted pyran type stabilisers or mixtures thereof with auxiliary stabilisers as defined in the preceding paragraph may be used in conjunction with other conventional stabilisers. For example it is known that hydrolysis and thermal decomposition of methyl chloroform can occur under the influence of water and heat, particularly in the presence of metals such as iron and zinc, with the development of acidity, and it has been proposed to inhibit this type of decomposition or to remove the acidity as it is formed by incorporating an epoxide (oxirane) in the solvent. We have found that proportions of epoxide in the range 0.1–1.0% by weight of the methyl chloroform can advantageously be included in the stabilised compositions of the invention. Very suitable epoxides are the aliphatic epoxides containing 3–6 carbon atoms, particularly the butene oxides.

The invention is further illustrated by the following examples in which the performance of substituted pyran type stabilisers according to the invention is compared with the performance of prior art stabilisers and some structurally analogous compounds in protecting methyl chloroform against metal-catalysed decomposition. The percentage of each additive is expressed by volume calculated on the volume of the methyl chloroform and/or by weight calculated on the weight of the methyl chloroform as indicated in the tables of results.

EXAMPLE 1

When an aluminium sheet is immersed in unstablised methyl chloroform and scratched deeply with a pointed metal scribing tool the solvent in the vicinity of the scratch discolours rapidly, then the entire volume of solvent quickly becomes black and copious fumes of hydrogen chloride are emitted. If the reaction is allowed to continue, the container becomes filled with a mass of tar. In this example methyl chloroform containing an additive as shown in the following table was submitted to this scratch test. The results after 2 hours are shown in the table.

| Additive | Concentration of additive, percent w./w. | Result |
|---|---|---|
| 2,3-dihydropyran | 2 | Solvent black. |
| Tetrahydropyran | 2 | Do. |
| 2-methoxy-2,3-dihydropyran | 2 | Solvent pale straw. |
| 2-ethoxy-2,3-dihydropyran | 2 | Do. |
| 2-methoxytetrahydropyran | 2 | Do. |
| 4-hydroxytetrahydropyran | 2 | Do. |

EXAMPLE 2

The procedure of Example 1 was repeated over longer periods of observation on samples of methyl chloroform containing an additive or mixture of additives as shown in the following table of results.

| Additive | Concentration of additive | | Result |
|---|---|---|---|
| | Percent v./v. | Percent w./w. | |
| 2-methoxy-2,3-dihydropyran | 2 | 1.4 | No reaction in 5 hours. |
| 4-hydroxypyran | 2 | 1.3 | Do. |
| B-(4-pyranyl)ether | 2 | 1.4 | No reaction in 7 hours. |
| 1,4-dioxane | 2 | 1.5 | Slight reaction in 30 minutes. |
| Tetrahydrofurfuryl alcohol | 2 | 1.6 | Moderate reaction in 30 minutes. |
| Trioxane | 4 | 3.5 | Immediate slow reaction. |
| Additives used together: | | | |
|   Acetonitrile | 2 | 1.2 | |
|   Nitromethane | 1 | 0.8 | Decomposition after 1 hour. |
|   1,3-dioxolane | 2 | 1.6 | |

EXAMPLE 3

30 ml. of methyl chloroform containing additives as shown in the following table were refluxed with 4 grams of aluminum alloy swarf. The results are shown in the table. When unstabilised methyl chloroform is submitted to this test, decomposition occurs immediately with discolouration and rapid evolution of hydrogen chloride.

| Additive | Concentration of additive | | Result |
|---|---|---|---|
| | Percent v./v. | Percent w./w. | |
| 2-methoxy-2,3-dihydropyran | 2 | 1.4 | No reaction in 500 hours. |
| 2-ethoxy-2,3-dihydropyran | | 2 | Do. |
| 2-methoxy-2,3-dihydropyran | | 0.5 | Do. |
| Isopropyl nitrate | | 2 | |
| 2-ethoxy-2,3-dihydropyran | | 0.5 | |
| Isopropyl nitrate | | 1.5 | Do. |
| Tert. butanol | | 1 | |
| 2-ethoxy-2,3-dihydropyran | | 0.5 | |
| Isopropyl nitrate | | 1 | Do. |
| Tert. butanol | | 1 | |
| Styrene oxide | | 0.25 | |
| 2,3-dihydropyran | | 2 | Reaction in less than 16 hours. |
| Tetrahydropyran | | 2 | Reaction in 30 minutes. |
| Tertiary butanol | 2 | 1.1 | Do. |
| Nitroethane | 1 | 0.8 | Immediate reaction. |
| Nitropropane | 2.25 | 1.7 | Do. |
| 1,2-dimethoxyethane | 3 | 1.9 | Reaction in a few minutes. |
| 2-methoxyethanol | 2 | 1.4 | Do. |
| Trioxane | 1 | 0.9 | Do. |
| Di-isopropyl ether | 3 | 1.6 | Do. |

EXAMPLE 4

In a conical flask an aluminium/brass couple consisting of an aluminium nut into which a brass bolt had been screwed was immersed in 30 ml. of methyl chloroform containing additives as shown in the following table. The flask was place in a water bath maintained at 60° C. and was irradiated with ultrasonic energy at a frequency of 40 kHz. The results are shown in the table. When unstabilised methyl chloroform is submitted to this test, tar formation occurs almost immediately at the junction of the nut and bolt, gas is evolved and the liquid blackens throughout.

| Additive | Concentration of additive | | Result |
|---|---|---|---|
| | Percent v./v. | Percent w./w. | |
| 2-methoxy-2,3-dihydropyran | 2 | 1.4 | No reaction after 1 hour. |
| Do | | 0.5 | Do. |
| Isopropyl nitrate | | 1.5 | |
| 2-methoxy-2,3-dihydropyran | | 0.5 | Reaction in 1 hour but not complete. |
| Isopropyl nitrate | 1 | 1 | |
| Butene oxide | | 0.25 | |
| 2,3-dihydropyran | | 2 | Complete tar formation in 15 minutes. |
| Tetrahydropyran | | 2 | Violent reaction in 5 minutes. |
| Tetrahydrofurfuryl alcohol | 2 | 1.6 | Darkening of the solvent and tar formation after 5 minutes. |
| 1,4-dioxane | 3 | 2.3 | Reaction in less than 15 minutes. |
| Allyl ethyl ether | 5 | 2.8 | Reaction in 5 minutes. |
| Nitromethane | 3 | 2.5 | Reaction in less than 15 minutes. |

EXAMPLE 5

250 ml. of methyl chloroform were placed in a 500 ml. conical flask together with 1.5 grams of aluminium filings and three strips, each 3 inch x ½ inch x ⅛ inch, of copper, mild steel and aluminium alloy respectively. The flask was surmounted by a Soxhlet extractor modified to retain a constant head of liquid above the flask, and a reflux condenser was fitted above the extractor. 50 ml. of methyl chloroform were placed in the extractor and strips of copper, mild steel and aluminium alloy as in the flask were placed in the extractor so as to be partly immersed in the liquid methyl chloroform and partly in the vapour space. The flask was heated so that the solvent boiled continuously and condensate from the vapour passing up to the condenser returned to the flask by way of the Soxhlet extractor, overflowing from the pool of liquid therein. With unstabilised methyl chloroform in the flask and extractor a vigorous reaction took place almost immediately with rapid darkening of the solvent and copious evolution of hydrogen chloride. The solvent was converted to a tar. The above procedure was repeated using methyl chloroform containing an additive or a mixture of additives as shown in the following table of results in both the flask and the extractor.

| Additive | Concentration of additives | | Result |
| --- | --- | --- | --- |
| | Percent v./v. | Percent w./w. | |
| 2-methoxy-2,3-dihydropyran | 2 | 1.4 | No reaction in 48 hours. |
| Additives used together: | | | |
| 2-methoxy-2,3-dihydropyran | 1 | 0.7 | Liquor clear and very pale yellow, metals bright after 48 hours, pitting negligible. |
| Isopropyl nitrate | 1 | 0.7 | |
| Ethylene diacetate | 2 | 1.6 | Vigorous reaction after 12 hours. |
| Additives used together: | | | |
| Isopropylnitrate | 3 | 2.3 | Reaction to give tarry products and extensive corrosion of aluminium strips in less than 48 hours. |
| Butene oxide | 0.25 | 0.2 | |
| Isopropyl alcohol | 2 | 1.2 | |
| 1,4-dioxane | 2 | 1.5 | Liquor in flask and extractor cloudy and metal stained in vapour phase after 48 hours. |
| 2-methoxyethanol | 2 | 1.4 | Severe staining and some acid produced in 48 hours. |

What we claim is:

1. A stabilized solvent composition consisting essentially of methylchloroform and as a stabilizer therefor 0.5–10% by weight of the methylchloroform of a compound selected from the group consisting of pyran, dihydropyran and tetrahydropyran substituted in any one of the 2, 3, 4, 5, and 6 positions by an —OR group where R is a hydrogen atom, an alkyl radical containing up to six carbon atoms or a pyranyl, dihydropyranyl, or tetrahydropyranyl radical.

2. A composition as claimed in claim 1, wherein the amount of the said stabiliser compound is in the range of 1–4% by weight of the methyl chloroform.

3. A composition as claimed in claim 1, wherein the said stabiliser compound is 2-methoxy-2,3-dihydropyran.

4. A composition as claimed in claim 1, wherein the said stabiliser compound is 4-hydroxypyran.

5. A composition as claimed in claim 1, wherein the said stabiliser compound is bis(4-pyranyl)ether.

6. A composition as claimed in claim 1 to which 0.5–10% by weight of the methylchloroform is added at least one member selected from the group consisting of acetonitrile, acrylonitrile, dimethoxyethane, tertiary butanol, isopropyl nitrate, nitromethane, nitroethane and ethyl acetate.

7. A composition as claimed in claim 6, wherein the proportion of each one of said members which is present in the composition is in the range 1–4% by weight of the methylchloroform.

8. A composition as claimed in claim 1, to which 0.1–1.0% by weight of the methychloroform is added an aliphatic epoxide containing 3–6 carbon atoms.

9. A composition according to claim 8, wherein the said epoxide is butene oxide.

References Cited

UNITED STATES PATENTS

| 2,422,648 | 6/1947 | Williams et al. | 260—345.1 |
| 2,870,094 | 1/1959 | Cathcart | 260—652.5 |
| 3,223,660 | 12/1965 | Pulver et al. | 252—407 |
| 3,248,327 | 4/1966 | Whitaker | 252—407 |
| 3,265,747 | 8/1966 | Cormony | 252—170 |
| 3,326,989 | 6/1967 | Cormony | 252—170 |

LEON D. ROSDOL, Primary Examiner

W. E. SCHULZ, Assistant Examiner

U.S. Cl. X.R.

252—170; 260—652.5